March 20, 1962 W. THURNAUER 3,026,080
HANDRAIL SUPPORT
Filed April 1, 1958
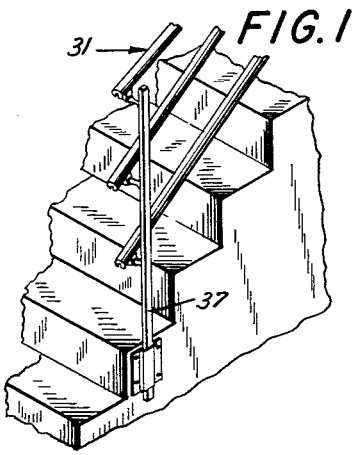
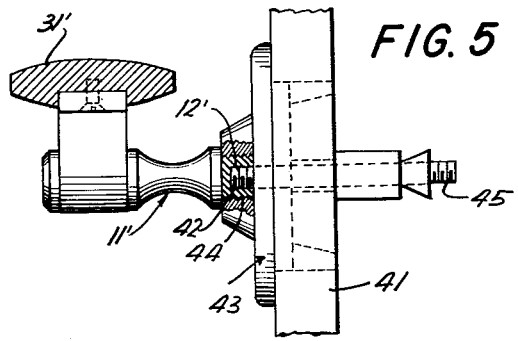
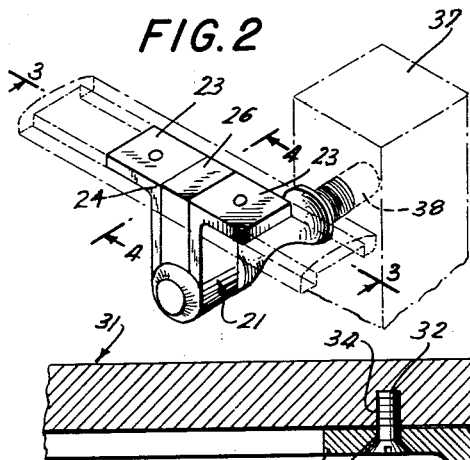
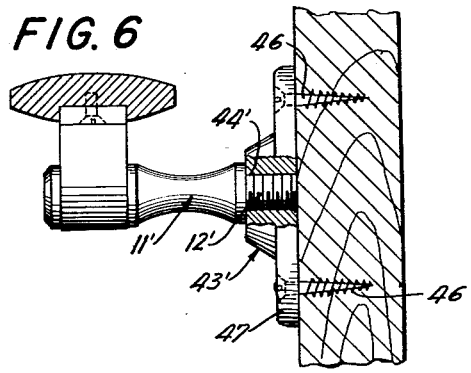
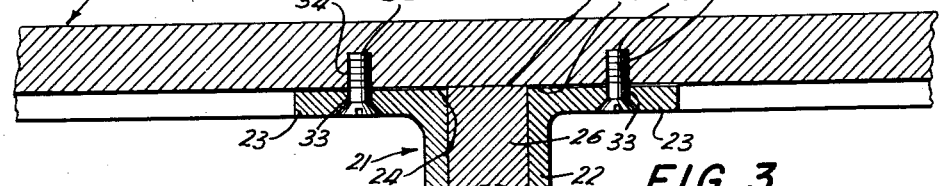
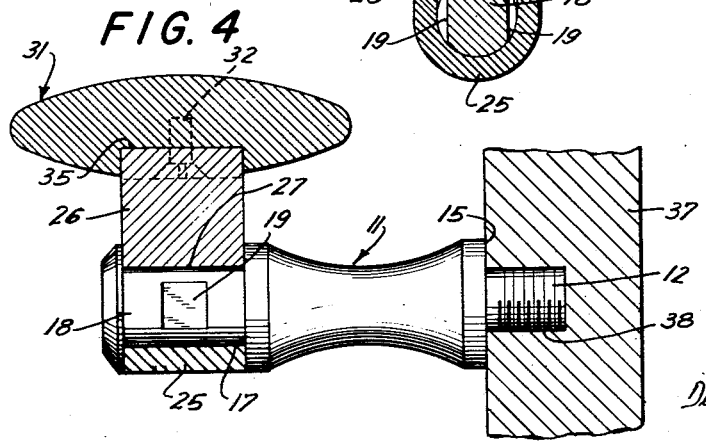
INVENTOR
WILLIAM THURNAUER
BY
ATTORNEYS

3,026,080
HANDRAIL SUPPORT

William Thurnauer, West Englewood, N.J., assignor to Julius Blum & Co., Inc., Carlstadt, N.J., a corporation of New York
Filed Apr. 1, 1958, Ser. No. 725,740
3 Claims. (Cl. 248—251)

As conducive to an understanding of the invention, it is noted that where a handrail support has a wall flange and a mounting arm with associated mounting flanges formed as an integral unit and the flange is secured to a wall by rivets or screws in manner that precludes subsequent rotation of the arm, the mounting of a multiplicity of supports to posts or to the side wall of a stairway, for example, to carry an inclined handrail, is a time-consuming procedure as each arm would have to be set to the proper angle so that the handrail would rest flush against the associated mounting flanges.

Where, to avoid such difficulty, the mounting flanges are rotatably mounted on the mounting arm so that they may properly be aligned with the handrail after the mounting arm is secured to the wall and no means are provided to lock the mounting flanges with respect to the arms after installation of the latter, the resultant play would cause objectionable rattling and vibration.

Where the handrail support is of the type that has a concealed fastening to a wall or post, i.e., where the end of the mounting arm is threaded and screwed into a corresponding tapped opening, or where the end of the mounting arm has a tapped bore to receive a bolt fixed into the wall or post, and the arm must be forcibly turned, firmly to mount it with respect to the opening or bolt, as the case may be, denting or marring of the surface of the arm by the wrench or other tool used for such installation frequently occurs which will detract from the appearance of the assembled unit, especially when the tool is applied to an exposed surface of the arm.

It is accordingly among the objects of the invention to provide a handrail support that has but few parts that may readily be fabricated at relatively low cost, that is attractive in appearance and is simple to mount upon a wall or post and the arm of which, even though of aluminum or other soft material, may be firmly mounted by the use of a wrench or similar tool, yet without marring of any exposed surface thereof and with respect to which the handrail may readily be affixed without looseness or jiggling even under severe impact or shock and at the desired inclination, without in any way loosening the secure mount of the arm to the wall or post.

According to the invention, from its broader aspect, the handrail support comprises a rod having suitable means at one end for mounting the latter to a wall or post. The rod is straddled by the legs of a substantially U-shaped mounting bracket, which legs extend outwardly from the rod at substantially right angles thereto and have outwardly extending mounting flanges at their free ends. Positioned between the legs of the bracket is a locking block, one end of which seats against the rod and the other end of which protrudes slightly beyond the mounting flanges.

The flanges are secured to the undersurface of a handrail by means of screws extending through suitable openings in said flanges and when the screws are tightened, pressure will be exerted against the protruding end of the locking block to press the other end thereof against the rod to lock the bracket with respect thereto.

The rod has an annular groove to receive the U-shaped mounting bracket and the reduced diameter portion of the rod defined by the annular groove is conformed to receive a wrench for rotation of the rod securely to mount the latter to the wall or post.

In the accompanying drawings in which are shown one or more of various possible embodiments of the several features of the invention, FIG. 1 is a fragmentary perspective view of a typical installation of the support, FIG. 2 is a perspective view of the support according to one embodiment of the invention, FIG. 3 is a longitudinal sectional view taken along line 3—3 of FIG. 2, FIG. 4 is a transverse sectional view taken along line 4—4 of FIG. 2, and FIGS. 5 and 6 are side elevational views partly in cross section of two other embodiments of the invention.

Referring now to the drawings, the handrail support shown comprises an arm 11 desirably machined from a solid rod, preferably of aluminum, but other metal may be used if desired. The inner end of the rod has a reduced diameter portion 12 formed integral therewith and extending axially thereof, said reduced diameter portion being threaded and defining an annular shoulder 15.

The outer end of the rod has an annular groove 17 therein defining a reduced diameter portion 18 between the ends of the groove which desirably has opposed flats 19 formed therein to facilitate rotation of the rod by a suitable tool for installation thereof.

Associated with the arm 11 is a mounting bracket 21 which desirably comprises a substantially U-shaped member having parallel legs 22 so spaced that the reduced diameter portion 18 of the rod will readily fit therein with but slight clearance, the width of said bracket 21 extending substantially the length of the groove in the rod, each of the legs 22 having a flange 23 at the free end 24 thereof extending outwardly therefrom at right angles thereto.

The legs 22 are of width but slightly less than the length of annular groove 17; of thickness substantially equal to the depth of the annular groove and the curvature of the cross piece 25 of the U-shaped member corresponds to that of the reduced diameter portion 18. Thus, the bracket 21 will fit readily in annular groove 17 with the legs 22 extending beyond said arm at right angles to the axis thereof.

Associated with the bracket 21 is a locking block 26 which in transverse cross section has a width substantially equal to the spacing between the legs 22 and a length substantially equal to the width of said legs. The inner end of the block has an arcuate groove 28 adapted to seat against the reduced diameter portion 18 of the arm 11 and the height of the block is such that when the inner end thereof is against reduced diameter portion 18, the outer end 29 of the block will extend slightly beyond the ends 24 of legs 22 as shown in FIG. 3.

The bracket 21 is designed to be secured to a handrail 31 by means of screws 32 extending through holes 33 in each of the flanges 23 into threaded apertures 34 through the undersurface of the handrail. In the preferred embodiment shown, the handrail 31 has a longitudinal channel 35 in its undersurface of width substantially equal to that of flanges 23 so that they may be accommodated therein with practically no play.

According to one illustrative application of the support, the arm is to be mounted on an associated post 37 which rises from the stairway, for example, as shown in FIGS. 1 and 4. In such application, the post desirably has a tapped opening 38 to receive the threaded end 12 of the arm 11 and the arm is tightened by applying a wrench to the flats 19 on reduced diameter portion 18 and rotating the arm until the shoulder 15 is pressed tightly against the rim about the opening 38 in the post.

Thereupon, the bracket 21 is positioned so that the legs 22 thereof straddle the reduced diameter portion 18 and the block 26 is positioned between the legs 22 with the arcuate groove 28 in the inner end thereof against said reduced diameter portion 18.

The handrail 31 is then positioned so that the flanges 23 of legs 22 are positioned in longitudinal groove 35 with the openings 33 in said flanges aligned with the threaded apertures 34 in the handrail. The screws 32 are then inserted through openings 33 into said threaded apertures 34 and tightened.

As the block 26 extends slightly beyond the ends of the legs 24, when the screws 32 are tightened, the block 26 will be urged inwardly so that its grooved inner end 27 will press tightly against the reduced diameter portion 18 securely to lock the bracket to the arm.

The embodiments shown in FIGS. 5 and 6 differ from those shown in FIGS. 1-4 substantially only in the method of mounting of the arm 11'.

Thus, referring to FIG. 5, where the arm is to be mounted on a wall 41, a wall plate 43 having a threaded central opening 44 is screwed on the threaded end 12' of the arm 11'. Thereupon, the arm 11' with the wall plate secured thereto is screwed upon a bolt 45 previously secured in the wall 41 and which is threaded into bore 42 in the threaded end 12' of the arm 11'. The arm 11' is tightened as by the use of a wrench applied to the flats of reduced diameter portion 18 and the handrail 31' may then be secured to the support in the manner previously described.

In the embodiment shown in FIG. 6, the wall plate 43' is secured to the wall as by screws 46 extending through the flange 47 of the wall plate. The threaded end 12' of the arm 11' is then screwed into the central opening 44' in the wall plate and tightened. The assembly is completed as previously described.

The support lends itself especially to its application to a narrow post as above shown, which is not of sufficient width to accommodate a wall plate or even an expansion bolt, for all that is required is a relatively small tapped-opening to accommodate the correspondingly threaded end 12 of the arm 11.

With the construction above described, it is a simple matter to have the arm 11 and the legs 22 of bracket 21 of length such that when the arm is secured to a wall or post and the handrail 31 secured to the flanges 23 of the bracket, the handrail will be supported at sufficient distance from the wall or post and from the arm 11, that the hand of the user will not rub against the wall or post or strike the arm 11.

As the support has but few parts which may readily be fabricated from inexpensive metal, it is of relatively low cost and since but a simple manipulation, i.e., the rotation of the arm as by a wrench applied to the flats 19, is required to secure the rod to a wall or post and another simple manipulation, i.e., the rotation of but two screws 32 is required to secure the handrail to each support, installation may rapidly be effected.

Even if the arm should be marred by the wrench in the tightening operation, the attractive appearance of the installation is not impaired since the bracket conceals any such marred portion.

The ease of installation is enhanced by the fact that the arms are secured in fixed position, regardless of the inclination of the handrail and the brackets are readily adjustable to the desired inclination of the hand rail in tightening the screws 32, simultaneously to lock the bracket to the arms and to the handrail.

As the mounting arm 11 and the bracket 21 are securely locked together when the screws 32 are tightened, the support will form an integral unit with no loosening and as the elements of the support are made from strong durable material, as is the handrail itself, the installation will withstand long use and considerable abuse.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A handrail support comprising a carrying rod, cylindrical at its outer end portion, an annular groove of uniform depth peripherally of said cylindrical portion, of width extending for the major part and substantially midway of the length of said cylindrical portion, means at the other end of said rod for mounting the same, a substantially U-shaped mounting bracket strap of uniform width slightly less than the length of said annular groove, and of thickness substantially equal to the depth of said groove, straddling said rod at said groove and having a pair of legs substantially longer than the diameter of said cylindrical end of said support rod, extending outwardly from said rod at substantially right angles to the axis thereof, a locking member between said legs, of width substantially to fill the space between said legs and of length such that with one end thereof against said rod the other end thereof will protrude slightly beyond the free ends of said legs and means to connect said legs to such handrail, so that the latter will exert pressure against the protruding end of the locking member to urge the inner end thereof against said rod to lock the latter with respect to the bracket strap.

2. A handrail supporting comprising a carrying rod, having a cylindrical length at its outer end, an annular groove of uniform depth, peripherally of said cylindrical length, of width extending for the major part and substantially midway of the length of said cylindrical portion mounting means for said rod at its other end, a substantially U-shaped bracket strap of uniform width slightly less than the length of said groove, said bracket strap having a pair of legs of length substantially longer than the diameter of said cylindrical length, said U-shaped bracket strap including a cross-piece joining said legs, of curvature corresponding to that of the grooved portion of the rod, the thickness of the legs and cross-piece of the bracket strap being substantially equal to the depth of the annular groove, whereby said legs fit into said annular groove and straddle the same, said legs extending outwardly from said rod at substantially right angles to the axis thereof, a locking block of width substantially to fill the space beween said legs, having a cylindrically arcuate inner end to fit the curvature of the grooved portion of said rod, and of length such that with the inner end thereof against the grooved portion of said rod the outer end thereof will protrude slightly beyond the free ends of said legs and means to connect said legs to such handrail for the latter to exert pressure against the protruding outer end of the locking block to urge the inner end thereof against the grooved portion of said rod to lock the latter with respect to the bracket strap.

3. The combination set forth in claim 2 in which said reduced diameter portion has diametrically opposed flats formed therein.

References Cited in the file of this patent

UNITED STATES PATENTS

| | | |
|---|---|---|
| 39,875 | Betts | Sept. 15, 1863 |
| 1,435,225 | Gilchrest | Nov. 14, 1922 |
| 1,437,266 | Jones | Nov. 28, 1922 |
| 1,712,796 | Jarvis | May 14, 1929 |
| 2,903,223 | De Gray | Sept. 8, 1959 |

FOREIGN PATENTS

| | | |
|---|---|---|
| 509,657 | France | Aug. 23, 1920 |